US010200092B1

(12) United States Patent
Irci et al.

(10) Patent No.: US 10,200,092 B1
(45) Date of Patent: Feb. 5, 2019

(54) ELECTRONIC DEVICE HAVING MULTIPLE ANTENNAS WITH SHARED STRUCTURES FOR NEAR-FIELD COMMUNICATIONS AND NON-NEAR-FIELD COMMUNICATIONS

(71) Applicant: Apple Inc., Cupertino, CA (US)

(72) Inventors: Erdinc Irci, Sunnyvale, CA (US); Han Wang, San Jose, CA (US); Georgios Atmatzakis, Cupertino, CA (US); Enrique Ayala Vazquez, Watsonville, CA (US); Erica J. Tong, Pacifica, CA (US); Xu Gao, Santa Clara, CA (US); Hongfei Hu, Cupertino, CA (US); Nanbo Jin, San Jose, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/719,317

(22) Filed: Sep. 28, 2017

(51) Int. Cl.
*H04B 5/02* (2006.01)
*H04B 5/00* (2006.01)
*H04B 7/0413* (2017.01)

(52) U.S. Cl.
CPC ............. *H04B 5/02* (2013.01); *H04B 5/0031* (2013.01); *H04B 7/0413* (2013.01)

(58) Field of Classification Search
CPC ....... H04B 5/02; H04B 7/0413; H04B 5/0031
USPC ...................................................... 455/575.7
See application file for complete search history.

(56) References Cited

U.S. PATENT DOCUMENTS

| 8,971,821 | B2 | 3/2015 | Schlub et al. |
| 9,024,823 | B2 | 5/2015 | Bevelacqua |
| 9,203,463 | B2 | 12/2015 | Asrani et al. |
| 9,325,080 | B2 | 4/2016 | Ouyang et al. |
| 9,455,493 | B2 | 9/2016 | Martiskainen et al. |
| 9,692,860 | B2 | 6/2017 | Lee et al. |
| 9,728,853 | B2 | 8/2017 | Hung |
| 9,793,616 | B2 | 10/2017 | Ouyang et al. |
| 2015/0303568 | A1 | 10/2015 | Yarga et al. |

OTHER PUBLICATIONS

Vazquez et al., U.S. Appl. No. 15/655,660, filed Jul. 20, 2017.
Vazquez et al., U.S. Appl. No. 15/657,001, filed Jul. 21, 2017.

*Primary Examiner* — Eugene Yun
(74) *Attorney, Agent, or Firm* — Treyz Law Group, P.C.; Michael H. Lyons

(57) ABSTRACT

An electronic device may include a peripheral conductive wall. A gap in the wall may divide the wall into first and second segments. The device may include a first antenna having a first resonating element arm formed from the first segment and a second antenna having a second resonating element arm formed from the second segment. A non-near-field communications transceiver may perform multiple-input and multiple-output (MIMO) operations using the first and second antennas. The gap may provide satisfactory isolation between the first and second antennas while the first and second antennas perform MIMO operations. Near-field communications circuitry may convey near-field communications signals over a conductive loop path that includes portions of the first and second segments and the antenna ground. The volume of the conductive loop path may extend across substantially all of a width of the electronic device.

14 Claims, 10 Drawing Sheets

ELECTRONIC DEVICE HAVING MULTIPLE ANTENNAS WITH SHARED STRUCTURES FOR NEAR-FIELD COMMUNICATIONS AND NON-NEAR-FIELD COMMUNICATIONS

BACKGROUND

This relates to electronic devices, and more particularly, to antennas for electronic devices with wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry such as near-field communications circuitry. Near-field communications schemes involve electromagnetically coupled communications over short distances, typically 20 cm or less.

To satisfy consumer demand for small form factor wireless devices, manufacturers are continually striving to implement wireless communications circuitry such as antenna components using compact structures. At the same time, there is a desire for wireless devices to cover a growing number of communications bands. For example, it may be desirable for a wireless device to cover a near-field communications band while simultaneously covering additional non-near-field (far-field) bands such cellular telephone bands, wireless local area network bands, and satellite navigation system bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies. In addition, it is often difficult to perform wireless communications with a satisfactory data rate (data throughput), especially as software applications performed by wireless devices become increasingly data hungry.

It would therefore be desirable to be able to provide improved wireless communications circuitry for wireless electronic devices.

SUMMARY

An electronic device may be provided with wireless circuitry and a housing having a peripheral conductive wall. A dielectric-filled gap in the peripheral conductive wall may divide the peripheral conductive wall into first and second segments. The wireless circuitry may include antenna structures. For example, the wireless circuitry may include a first antenna having a first resonating element arm formed from the first segment and a first antenna feed coupled between the first segment and the antenna ground. The wireless circuitry may include a second antenna having a second resonating element arm formed from the second segment and a second antenna feed coupled between the second segment and the antenna ground.

The wireless circuitry may include non-near-field communications transceiver circuitry coupled to the first and second antenna feeds and configured to convey non-near-field communications signals using the first and second antennas. The non-near-field communications transceiver circuitry may concurrently convey the non-near-field communications signals over both the first and second antennas using the same non-near-field communications frequencies under a multiple-input and multiple-output (MIMO) scheme. The dielectric-filled opening in the peripheral conductive wall may ensure that the first and second antennas are electromagnetically isolated at these frequencies.

The wireless circuitry may include near-field communications transceiver circuitry coupled to the second segment over a first inductor and configured to convey near-field communications signals over a conductive loop path that forms a loop antenna resonating element for a near-field communications loop antenna. A second inductor may be coupled between the first and second segments across the dielectric-filled opening. An inductive return path may be coupled between the first segment and the antenna ground. Capacitor circuitry may be used to prevent non-near-field communications signals from interfering with the near-field communications transceiver circuitry. The first and second inductors may isolate the first and second antennas at non-near-field communications frequencies. The conductive loop path for the near-field communications loop antenna may include the first and second segments of the peripheral conductive housing wall, the first and second inductors, the inductive return path, and portions of the antenna ground. In this way, the same antenna structures may be used to perform both non-near-field communications under a MIMO scheme (e.g., with maximal data throughput) and near-field communications while maximizing the volume of the near-field communications loop path.

DETAILED DESCRIPTION

Figure 1:
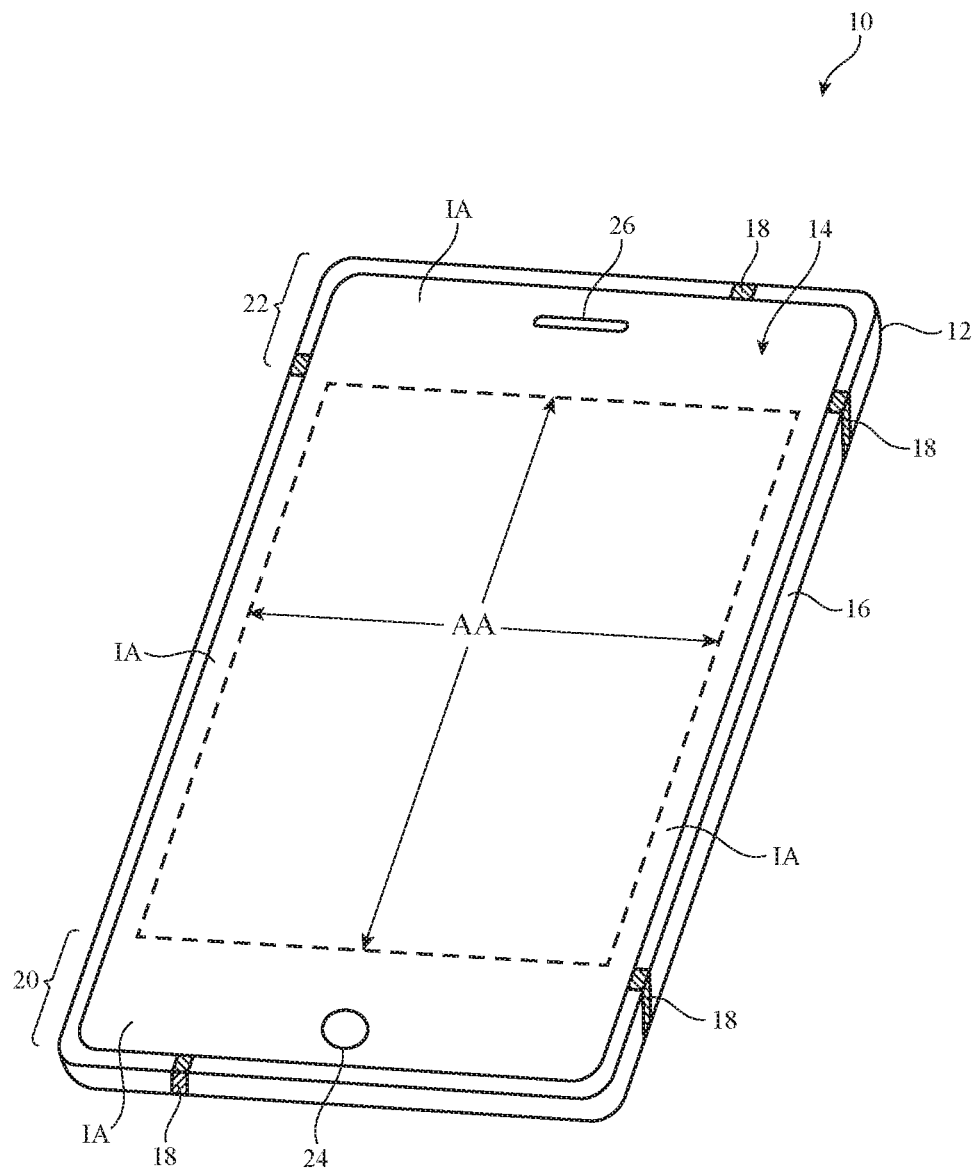
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include antenna structures. The antenna structures may include antennas for cellular telephone communications and/or other far-field (non-near-field) communications. Circuitry in the antenna structures may allow the antenna structures to form a near-field communications loop antenna to handle near-field communications. The antennas antenna structures may include loop antenna structures, inverted-F antenna structures, strip antenna structures, planar inverted-F antenna structures, slot antenna structures, hybrid antenna structures that include antenna structures of more than one type, or other suitable antenna structures. Conductive structures for the antenna structures may, if desired, be formed from conductive electronic device structures.

The conductive electronic device structures may include conductive housing structures. The housing structures may include peripheral structures such as peripheral conductive structures that run around the periphery of the electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane and/or an antenna resonating element formed from conductive housing structures (e.g., internal and/or external structures, support plate structures, etc.).

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a rear housing wall (e.g., a planar housing wall). The rear housing wall may have slots that pass entirely through the rear housing wall and that therefore separate housing wall portions (rear housing wall portions and/or sidewall portions) of housing 12 from each other. The rear housing wall may include conductive portions and/or dielectric portions. If desired, the rear housing wall may include a planar metal layer covered by a thin layer or coating of dielectric such as glass, plastic, sapphire, or ceramic. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. Buttons such as button 24 may pass through openings in the cover layer if desired. Button 24 may be omitted if desired. The cover layer may also have other openings such as an opening for speaker port 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, peripheral conductive housing sidewall structures, peripheral conductive housing sidewalls, peripheral conductive sidewalls, or a peripheral conductive housing member (as examples). Peripheral conductive housing structures 16 may be formed from a metal such as stainless steel, aluminum, or other suitable materials. One, two, or more than two separate structures may be used in forming peripheral conductive housing structures 16.

It is not necessary for peripheral conductive housing structures 16 to have a uniform cross-section. For example, the top portion of peripheral conductive housing structures 16 may, if desired, have an inwardly protruding lip that helps hold display 14 in place. The bottom portion of peripheral conductive housing structures 16 may also have an enlarged lip (e.g., in the plane of the rear surface of device 10). Peripheral conductive housing structures 16 may have substantially straight vertical sidewalls, may have sidewalls that are curved, or may have other suitable shapes. In some configurations (e.g., when peripheral conductive housing structures 16 serve as a bezel for display 14), peripheral conductive housing structures 16 may run around the lip of housing 12 (i.e., peripheral conductive housing structures 16 may cover only the edge of housing 12 that surrounds display 14 and not the rest of the sidewalls of housing 12).

If desired, housing 12 may have a conductive rear surface or wall. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a conductive rear housing wall of device 10 may be formed from a planar metal structure and portions of peripheral conductive housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The conductive rear wall of housing 12 may have one or more, two or more, or three or more portions. Peripheral conductive housing structures 16 and/or the conductive rear wall of housing 12 may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 16 and/or the conductive rear wall of housing 12 from view of the user).

Display 14 may have an array of pixels that form an active area AA that displays images for a user of device 10. An inactive border region such as inactive area IA may run along one or more of the peripheral edges of active area AA.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of member 16). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 16 and opposing conductive ground structures such as conductive portions of the rear wall of housing 12, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22.

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 16 may be provided with peripheral gap structures. For example, peripheral conductive housing structures 16 may be provided with one or more gaps such as gaps 18, as shown in FIG. 1. The gaps in peripheral conductive housing structures 16 may be filled with dielectric such as polymer, ceramic, glass, air, other dielectric materials, or combinations of these materials. Gaps 18 may divide peripheral conductive housing structures 16 into one or more peripheral conductive segments. There may be, for example, two peripheral conductive segments in peripheral conductive housing structures 16 (e.g., in an arrangement with two of gaps 18), three peripheral conductive segments (e.g., in an arrangement with three of gaps 18), four peripheral conductive segments (e.g., in an arrangement with four of gaps 18), six peripheral conductive segments (e.g., in an arrangement with six gaps 18), etc. The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 16 and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, etc.

Figure 2:
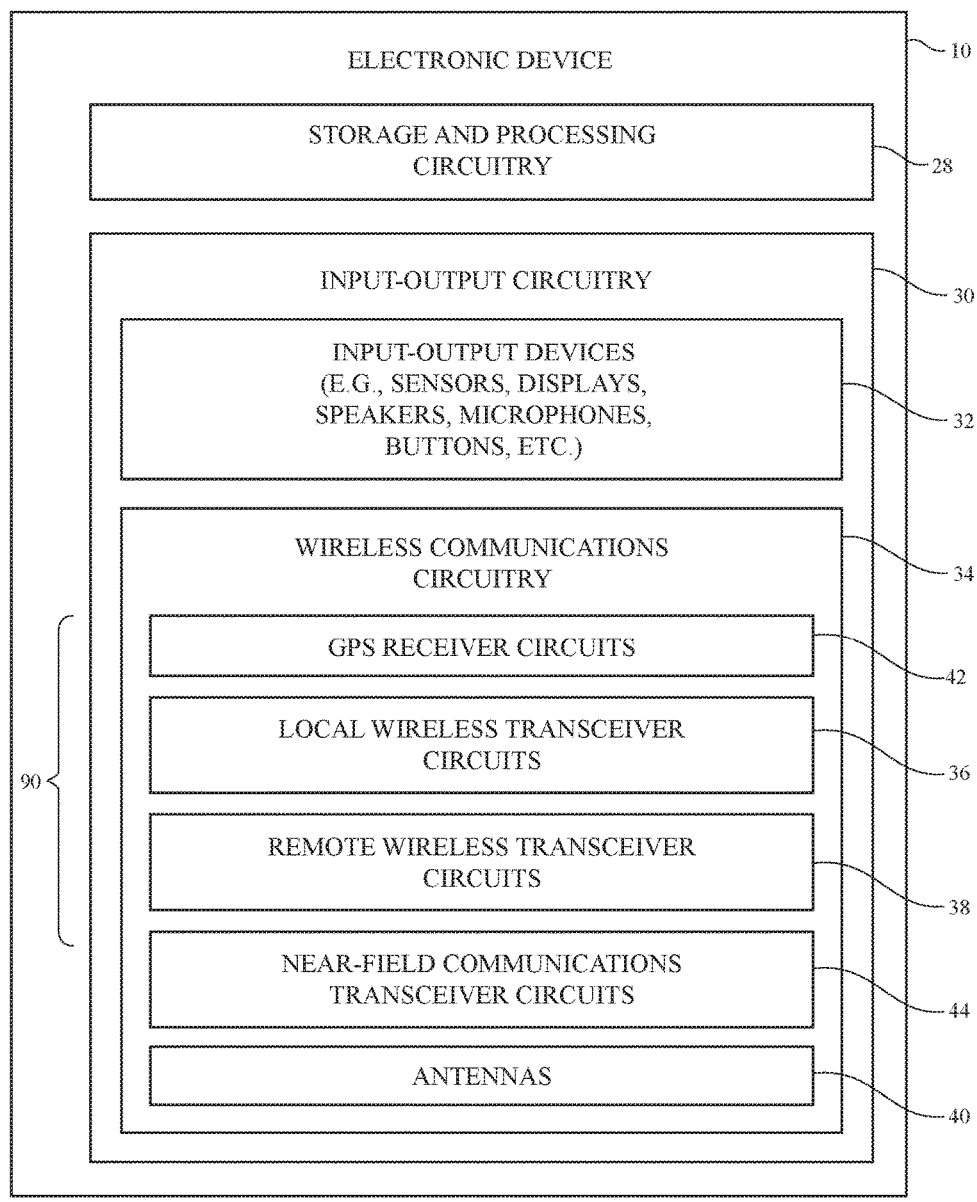
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOW) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, near-field communications (NFC) protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for Wi-Fi® (IEEE 802.11) communications and may handle the 2.4 GHz Bluetooth® communications band. Circuitry 34 may use cellular telephone transceiver circuitry 38 for handling wireless communications in frequency ranges such as a low communications band from 700 to 960 MHz, a low-midband from 960 to 1710 MHz, a midband from 1710 to 2170 MHz, a high band from 2300 to 2700 MHz, an ultra-high band from 3400 to 3700 MHz or other communications bands between 600 MHz and 4000 MHz or other suitable frequencies (as examples).

Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, etc. Wireless communications circuitry 34 may include global positioning system (GPS) receiver equipment such as GPS receiver circuitry 42 for receiving GPS signals at 1575 MHz or for handling other satellite positioning data. In Wi-Fi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may include near-field communications circuitry 44 (sometimes referred to herein as near-field communications transceiver circuitry 44, near-field communications transceiver circuits 44, near-field communications transceiver 44, near-field circuitry 44, near-field transceiver circuitry 44, or near-field transceiver 44). Near-field communications transceiver circuitry 44 may produce and receive near-field communications signals to support communications between device 10 and a near-field communications reader or other external near-field communications equipment. Near-field communications may be supported using loop antennas (e.g., to support inductive near-field communications in which a loop antenna in device 10 is electromagnetically near-field coupled to a corresponding loop antenna in a near-field communications reader). Near-field communications links typically are formed over distances of 20 cm or less (i.e., device 10 must be placed in the vicinity of the near-field communications reader for effective communications).

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of antennas 40 may be used in supporting near-field communications. The structures of antennas 40 may also be used in gathering proximity sensor signals (e.g., capacitive proximity sensor signals).

Radio-frequency transceiver circuitry 90 does not handle near-field communications signals and is therefore sometimes referred to as far-field communications circuitry, non-near-field communications circuitry, non-near-field circuitry, or non-near-field communications transceiver circuitry. Near-field communications transceiver circuitry 44 is used in handling near-field communications. With one suitable arrangement, near-field communications can be supported using signals at a frequency of 13.56 MHz or other frequencies below 600 MHz. Other near-field communications bands may be supported using the structures of antennas 40 if desired. Frequencies handled by near-field communications transceiver circuitry 44 in performing near-field communications using wireless near-field communications signals may sometimes be referred to herein as near-field communications frequencies. Transceiver circuitry 90 may handle non-near-field communications frequencies (e.g., frequencies above 600 MHz or other suitable frequencies).

Figure 3:
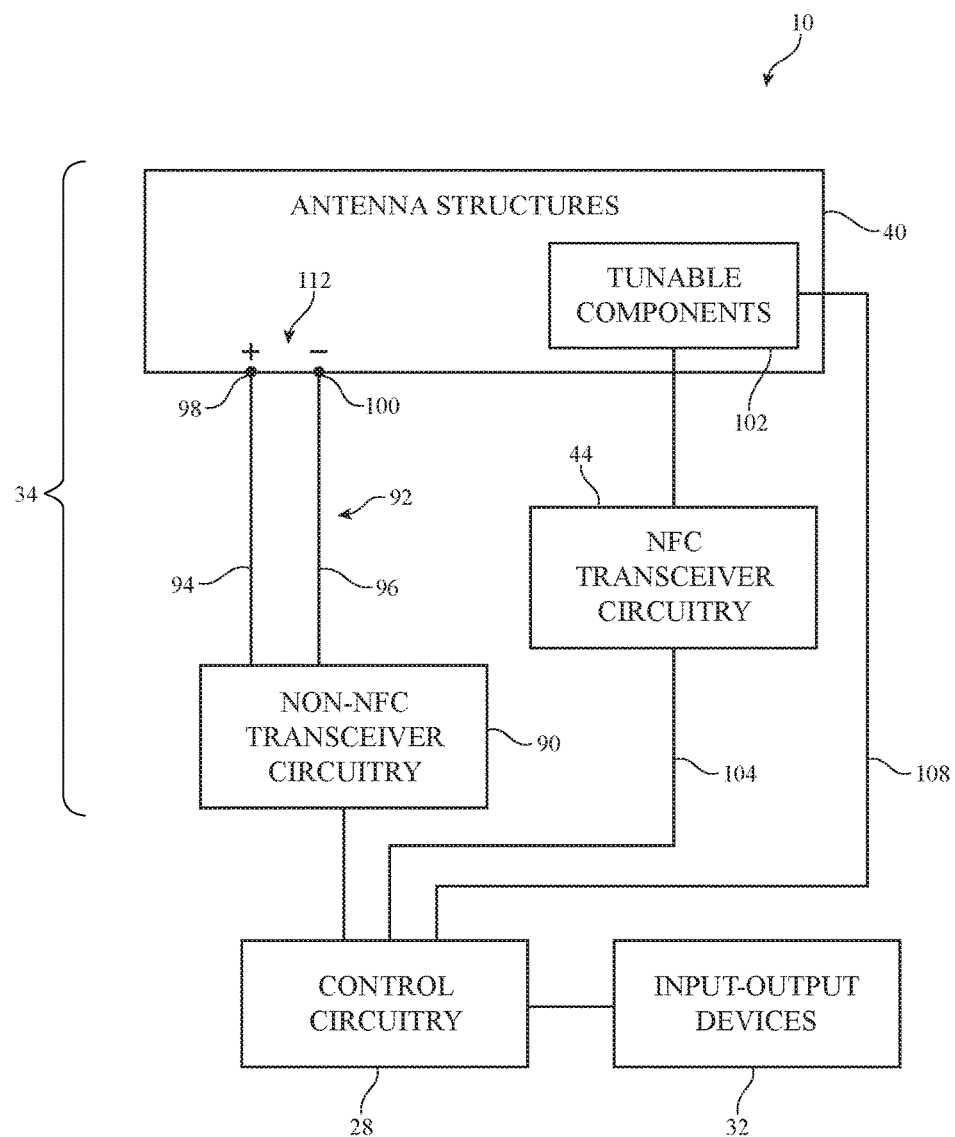
FIG. 3 is a schematic diagram of illustrative wireless communications circuitry in accordance with an embodiment.

The structures forming antennas 40 may sometimes be collectively referred to herein as antenna structures 40. As shown in FIG. 3, antenna structures 40 may be coupled to near-field communications circuitry such as near-field communications transceiver circuitry 44 and non-near-field communications circuitry such as non-near-field communications transceiver circuitry 90.

Non-near-field communications transceiver circuitry 90 in wireless circuitry 34 may be coupled to antenna structures 40 using paths such as path 92. Near-field communications transceiver circuitry 44 may be coupled to antenna structures 40 using paths such as path 104. Paths such as path 104 may be used to allow control circuitry 28 to transmit near-field communications data and to receive near-field communications data using a near-field communications antenna formed from structures 40.

Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with adjustable circuits such as tunable components 102 to tune antennas over communications bands of interest. Tunable components 102 may be part of a tunable filter or tunable impedance matching network, may be part of an antenna resonating element, may span a gap between an antenna resonating element and antenna ground, etc.

Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 108 that adjust inductance values, capacitance values, or other parameters associated with tunable components 102, thereby tuning antenna structures 40 to cover desired communications bands.

During operation of device 10, control circuitry 28 may issue control signals on one or more paths such as path 108 that adjust inductance values, capacitance values, or other parameters associated with tunable components 102, thereby tuning antenna structures 40 to cover desired communications bands. Active and/or passive components may also be used to allow antenna structures 40 to be shared between non-near-field communications transceiver circuitry 90 and near-field communications transceiver circuitry 44. Near-field communications and non-near-field communications may also be handled using two or more separate antennas, if desired.

Path 92 may include one or more transmission lines. As an example, signal path 92 of FIG. 3 may be a radio-frequency transmission line having a positive signal conductor such as line 94 and a ground signal conductor such as line 96. Transmission line structures used to form path 92 (sometimes referred to herein as transmission lines 92) may include parts of a coaxial cable, a stripline transmission line, microstrip transmission line, coaxial probes realized by metalized vias, edge-coupled microstrip transmission lines, edge-coupled stripline transmission lines, waveguide structures, transmission lines formed from combinations of transmission lines of these types, etc. Transmission lines in device 10 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network (e.g., an adjustable matching network formed using tunable components 102) may include components such as inductors, resistors, and capacitors used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed 112 with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used if desired. For example, antenna structures 40 may be fed using multiple feeds. The illustrative feeding configuration of FIG. 3 is merely illustrative.

If desired, control circuitry 28 may use an impedance measurement circuit to gather antenna impedance information. Control circuitry 28 may use information from a proximity sensor (see, e.g., sensors 32 of FIG. 2), received signal strength information, device orientation information from an orientation sensor, information about a usage scenario of device 10, information about whether audio is being played through speaker 26, information from one or more antenna impedance sensors, or other information in determining when antenna 40 is being affected by the presence of nearby external objects or is otherwise in need of tuning. In response, control circuitry 28 may adjust an adjustable inductor, adjustable capacitor, switch, or other tunable component 102 to ensure that antenna 40 operates as desired. Adjustments to component 102 may also be made to extend the coverage of antenna 40 (e.g., to cover desired communications bands that extend over a range of frequencies larger than antenna 40 would cover without tuning).

Antenna structures 40 may include resonating element structures (sometimes referred to herein as radiating element structures), antenna ground plane structures (sometimes referred to herein as ground plane structures, ground structures, or antenna ground structures), an antenna feed such as feed 112, and other components (e.g., tunable components 102). Antenna structures 40 may be configured to form any suitable types of antenna. With one suitable arrangement, which is sometimes described herein as an example, antenna structures 40 are used to implement a hybrid inverted-F-slot antenna that includes both inverted-F and slot antenna resonating elements.

Figure 4:
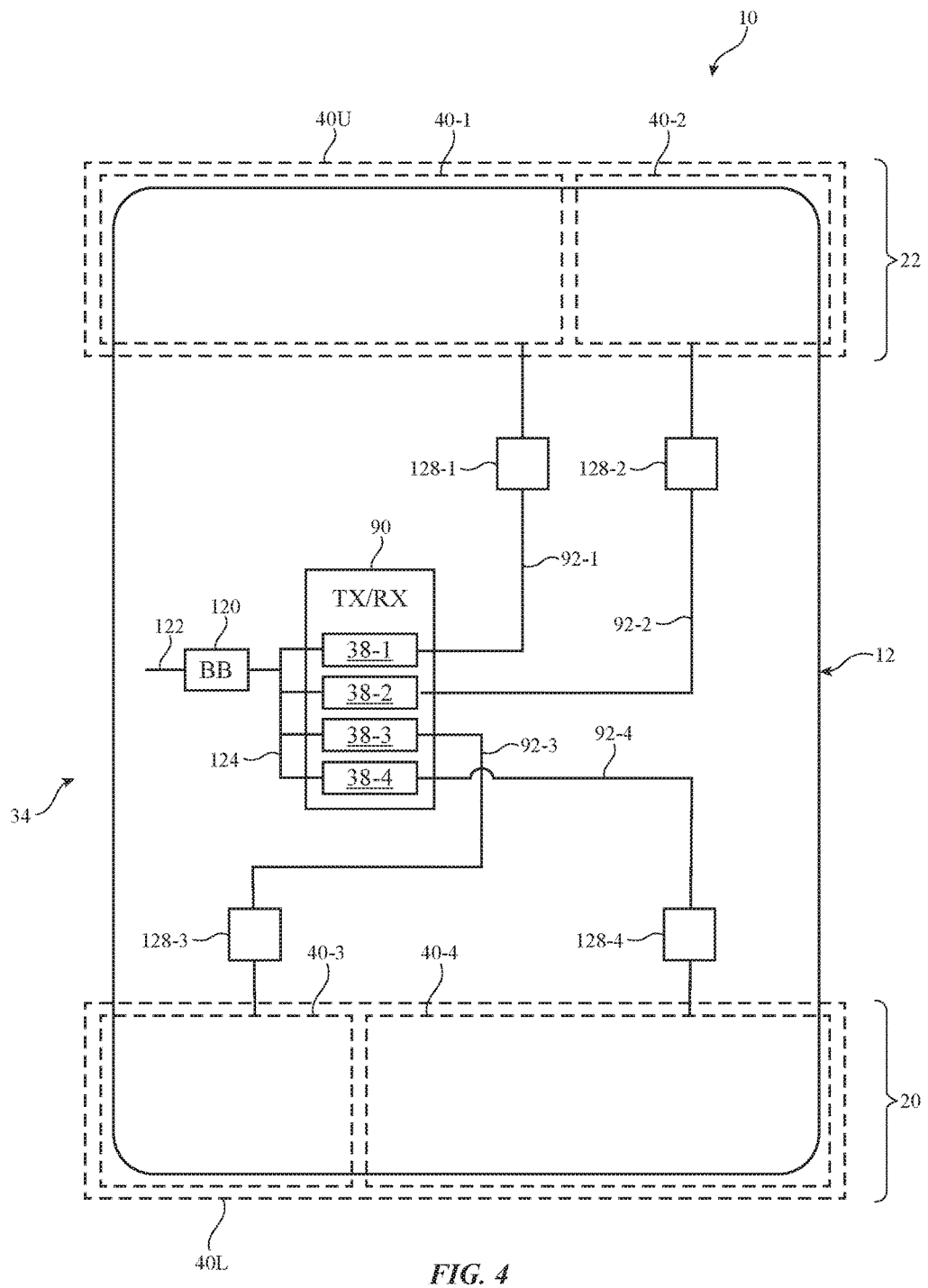
FIG. 4 is a diagram of illustrative wireless circuitry including multiple antennas for performing multiple-input and multiple-output (MIMO) communications in accordance with an embodiment.

If desired, multiple antennas 40 may be formed in device 10. Each antenna 40 may be coupled to transceiver circuitry such as non-near-field communications transceiver circuitry 90 over respective transmission lines 92. If desired, two or more antennas 40 may share the same transmission lines 92. FIG. 4 is a diagram showing how device 10 may include multiple antennas 40 for performing wireless communications.

As shown in FIG. 4, device 10 may include two or more antennas 40 such as a first antenna 40-1, a second antenna 40-2, a third antenna 40-3, and a fourth antenna 40-4. Antennas 40 may be provided at different locations within housing 12 of device 10. For example, antennas 40-1 and 40-2 may be formed within region 22 at a first (upper) end of housing 12 whereas antennas 40-3 and 40-4 are formed within region 20 at an opposing second (lower) end of housing 12. In the example of FIG. 3, housing 12 has a rectangular periphery (e.g., a periphery having four corners) and each antenna 40 is formed at a respective corner of housing 12. This example is merely illustrative and, in general, antennas 40 may be formed at any desired location within housing 12.

Wireless circuitry 34 may include input-output ports such as port 122 for interfacing with digital data circuits in storage and processing circuitry (e.g., storage and processing circuitry 28 of FIG. 1). Wireless circuitry 34 may include baseband circuitry such as baseband (BB) processor 120 and radio-frequency transceiver circuitry such as non-near-field communications transceiver circuitry 90.

Port 122 may receive digital data from storage and processing circuitry that is to be transmitted by non-near-field communications transceiver circuitry 90. Incoming data that has been received by non-near-field communications transceiver circuitry 90 and baseband processor 120 may be supplied to storage and processing circuitry via port 122.

Non-near-field communications transceiver circuitry 90 may include one or more transmitters and one or more receivers. For example, transceiver circuitry 90 may include multiple remote wireless transceivers 38 such as a first transceiver 38-1, a second transceiver 38-2, a third transceiver 38-3, and a fourth transceiver 38-4 (e.g., transceiver circuits for handling voice and non-voice cellular telephone communications in cellular telephone communications bands). Each transceiver 38 may be coupled to a respective antenna 40 over a corresponding transmission line 92 (e.g., a first transmission line 92-1, a second transmission line 92-2, a third transmission line 92-3, and a fourth transmission line 92-4). For example, first transceiver 38-1 may be coupled to antenna 40-1 over transmission line 92-1, second transceiver 38-2 may be coupled to antenna 40-2 over transmission line 92-2, third transceiver 38-3 may be coupled to antenna 40-3 over transmission line 92-3, and fourth transceiver 38-4 may be coupled to antenna 40-4 over transmission line 92-4.

Radio-frequency front end circuits 128 may be interposed on each transmission line 92 (e.g., a first front end circuit 128-1 may be interposed on line 92-1, a second front end circuit 128-2 may be interposed on line 92-2, a third front end circuit 128-3 may be interposed on line 92-3, etc.). Front end circuits 128 may each include switching circuitry, filter circuitry (e.g., duplexer and/or diplexer circuitry, notch filter circuitry, low pass filter circuitry, high pass filter circuitry, bandpass filter circuitry, etc.), impedance matching circuitry for matching the impedance of transmission line 92 to the corresponding antenna 40, networks of active and/or passive components such as components 102 of FIG. 3, radio-frequency coupler circuitry for gathering antenna impedance measurements, or any other desired radio-frequency circuitry. If desired, front end circuits 128 may include switching circuitry that is configured to selectively couple antennas 40-1, 40-2, 40-3, and 40-4 to different respective transceivers 38-1, 38-2, 38-3, and 38-4 (e.g., so that each antenna can handle communications for different transceivers 38 over time based on the state of the switching circuits in front end circuits 128).

If desired, front end circuits 128 may include filtering circuitry (e.g., duplexers and/or diplexers) that allow the corresponding antenna 40 to transmit and receive radio-frequency signals at the same time (e.g., using a frequency domain duplexing (FDD) scheme). Antennas 40-1, 40-2, 40-3, and 40-4 may transmit and/or receive radio-frequency signals in respective time slots or two or more of antennas 40-1, 40-2, 40-3, and 40-4 may transmit and/or receive radio-frequency signals concurrently. In general, any desired combination of transceivers 38-1, 38-2, 38-3, and 38-4 may transmit and/or receive radio-frequency signals using the corresponding antenna 40 at a given time. In one suitable arrangement, each of transceivers 38-1, 38-2, 38-3, and 38-4 may receive radio-frequency signals while a given one of transceivers 38-1, 38-2, 38-3, and 38-4 transmits radio-frequency signals at a given time.

Amplifier circuitry such as one or more power amplifiers may be interposed on transmission lines 92 and/or formed within non-near-field communications transceiver circuitry 90 for amplifying radio-frequency signals output by transceivers 38 prior to transmission over antennas 40. Amplifier circuitry such as one or more low noise amplifiers may be interposed on transmission lines 92 and/or formed within non-near-field communications transceiver circuitry 90 for amplifying radio-frequency signals received by antennas 40 prior to conveying the received signals to transceivers 38.

In the example of FIG. 3, separate front end circuits 128 are formed on each transmission line 92. This is merely illustrative. If desired, two or more transmission lines 92 may share the same front end circuits 128 (e.g., front end circuits 128 may be formed on the same substrate, module, or integrated circuit).

Each of transceivers 38 may, for example, include circuitry for converting baseband signals received from baseband processor 120 over path 124 into corresponding radio-frequency signals. For example, transceivers 38 may each include mixer circuitry for up-converting the baseband signals to radio-frequencies prior to transmission over antennas 40. Transceivers 38 may include digital to analog converter (DAC) and/or analog to digital converter (ADC) circuitry for converting signals between digital and analog domains. Each of transceivers 38 may include circuitry for converting radio-frequency signals received from antennas 40 over paths 92 into corresponding baseband signals. For example, transceivers 38 may each include mixer circuitry for down-converting the radio-frequency signals to baseband frequencies prior to conveying the baseband signals to baseband processor 120 over paths 124.

Each transceiver 38 may be formed on the same substrate, integrated circuit, or module (e.g., non-near-field communications transceiver circuitry 90 may be a transceiver module having a substrate or integrated circuit on which each of transceivers 38 are formed) or two or more transceivers 38 may be formed on separate substrates, integrated circuits, or modules. Baseband circuitry 120 and front end circuits 128 may be formed on the same substrate, integrated circuit, or module as transceivers 38 or may be formed on separate substrates, integrated circuits, or modules from transceivers 38. In another suitable arrangement, non-near-field communications transceiver circuitry 90 may include a single transceiver 38 having four ports, each of which is coupled to a respective transmission line 92, if desired. Each transceiver 38 may include transmitter and receiver circuitry for both transmitting and receiving radio-frequency signals. In another suitable arrangement, one or more transceivers 38 may perform only signal transmission or signal reception (e.g., one or more of circuits 38 may be a dedicated transmitter or dedicated receiver).

In the example of FIG. 4, antennas 40-1 and 40-4 may occupy a larger space (e.g., a larger area or volume within device 10) than antennas 40-2 and 40-3. This may allow antennas 40-1 and 40-4 to support communications at longer wavelengths (i.e., lower frequencies) than antennas 40-2 and 40-3. This is merely illustrative and, if desired, each of antennas 40-1, 40-2, 40-3, and 40-4 may occupy the same volume or may occupy different volumes. Antennas 40-1, 40-2, 40-3, and 40-4 may be configured to convey radio-frequency signals in at least one common frequency band. If desired, one or more of antennas 40-1, 40-2, 40-3, and 40-4 may handle radio-frequency signals in at least one frequency band that is not covered by one or more of the other antennas in device 10.

If desired, each antenna 40 and each transceiver 38 may handle radio-frequency communications in multiple frequency bands (e.g., multiple cellular telephone communications bands). For example, transceiver 38-1, antenna 40-1, transceiver 38-4, and antenna 40-4, may handle radio-frequency signals in a first frequency band such as a low band between 700 and 960 MHz, a second frequency band such as a midband between 1700 and 2200 MHz, and a third frequency band such as a high band between 2300 and 2700 MHz. Transceiver 38-2, antenna 40-2, transceiver 38-3, and antenna 40-3 may handle radio-frequency signals in the second frequency band between 1700 and 2200 MHz and the third frequency band between 2300 and 2700 MHz (e.g., antennas 40-2 and 40-3 may not occupy sufficient volume to support signals within the low band).

The example of FIG. 4 is merely illustrative. In general, antennas 40 may cover any desired frequency bands. Non-near-field communications transceiver circuitry 90 may include other transceiver circuits such as one or more circuits 36 or 42 of FIG. 2 coupled to one or more antennas 40. Housing 12 may have any desired shape. Forming each of antennas 40-1 through 40-4 at different corners of housing 12 may, for example, maximize the multi-path propagation of wireless data conveyed by antennas 40 to optimize overall data throughput for wireless circuitry 34.

When operating using a single antenna 40, a single stream of wireless data may be conveyed between device 10 and external communications equipment (e.g., one or more other wireless devices such as wireless base stations, access points, cellular telephones, computers, etc.). This may impose an upper limit on the data rate (data throughput) obtainable by wireless communications circuitry 34 in communicating with the external communications equipment. As software applications and other device operations increase in complexity over time, the amount of data that needs to be conveyed between device 10 and the external communications equipment typically increases, such that a single antenna 40 may not be capable of providing sufficient data throughput for handling the desired device operations.

In order to increase the overall data throughput of wireless circuitry 34, multiple antennas 40 may be operated using a multiple-input and multiple-output (MIMO) scheme. When operating using a MIMO scheme, two or more antennas 40 on device 10 may be used to convey multiple independent streams of wireless data at the same frequency. This may significantly increase the overall data throughput between device 10 and the external communications equipment relative to scenarios where only a single antenna 40 is used. In general, the greater the number of antennas 40 that are used for conveying wireless data under the MIMO scheme, the greater the overall throughput of circuitry 34.

However, if care is not taken, radio-frequency signals conveyed in the same frequency band by multiple antennas 40 may interfere with each other, serving to deteriorate the overall wireless performance of circuitry 34. Ensuring that antennas operating at the same frequency are electromagnetically isolated from each other can be particularly challenging for adjacent antennas 40 (e.g., antennas 40-1 and 40-2, antennas 40-3 and 40-4, etc.) and for antennas 40 that have common (shared) structures (e.g., that have resonating elements formed from adjacent or shared conductive portions of housing 12).

In order to perform wireless communications under a MIMO scheme, antennas 40 need to convey data at the same frequencies. If desired, wireless circuitry 34 may perform so-called two-stream (2×) MIMO operations (sometimes referred to herein as 2X MIMO communications or communications using a 2×MIMO scheme) in which two antennas 40 are used to convey two independent streams of radio-frequency signals at the same frequency. Wireless circuitry 34 may perform so-called four-stream (4×) MIMO operations (sometimes referred to herein as 4×MIMO communications or communications using a 4×MIMO scheme) in which four antennas 40 are used to convey four independent streams of radio-frequency signals at the same frequency. Performing 4×MIMO operations may support higher overall data throughput than 2×MIMO operations because 4×MIMO operations involve four independent wireless data streams whereas 2×MIMO operations involve only two independent wireless data streams. If desired, antennas 40-1, 40-2, 40-3, and 40-4 may perform 2×MIMO operations in some frequency bands and may perform 4×MIMO operations in other frequency bands (e.g., depending on which bands are handled by which antennas). Antennas 40-1, 40-2, 40-3, and 40-4 may perform 2×MIMO operations in some bands concurrently with performing 4×MIMO operations in other bands, for example.

As one example, antennas 40-1 and 40-4 (and the corresponding transceivers 38-1 and 38-4) may perform 2×MIMO operations by conveying radio-frequency signals at the same frequency in a low band (LB) between 600 MHz and 960 MHz. At the same time, antennas 40-1, 40-2, 40-3, and 40-4 may collectively perform 4×MIMO operations by conveying radio-frequency signals at the same frequency in a midband (MB) between 1700 and 2200 MHz and/or at the same frequency in a high band (HB) between 2300 and 2700 MHz (e.g., antennas 40-1 and 40-4 may perform 2×MIMO operations in the low band concurrently with performing 4×MIMO operations in the midband and/or high band).

If desired, antennas 40-1 and 40-2 may include switching circuitry that is adjusted by control circuitry (e.g., control circuitry 28 of FIG. 3). Control circuitry 28 may control the switching circuitry in antennas 40-1 and 40-2 to configure antenna structures in antennas 40-1 and 40-2 to form a single antenna 40U in region 66 of device 10. Similarly, antennas 40-3 and 40-4 may include switching circuitry that is adjusted by control circuitry 28. Control circuitry 28 may control the switching circuitry in antennas 40-3 and 40-4 to form a single antenna 40L (e.g., an antenna 40L that includes antenna structures from antennas 40-3 and 40-4) in region 68 of device 10. Antenna 40U may, for example, be formed at an upper end of housing 12 and may therefore sometimes be referred to herein as upper antenna 40U. Antenna 40L may be formed at an opposing lower end of housing 12 and may therefore sometimes be referred to herein as lower antenna 40L. When antennas 40-1 and 40-2 are configured to form upper antenna 40U and antennas 40-3 and 40-4 are configured to form lower antenna 40L, wireless circuitry 34 may perform 2×MIMO operations using antennas 40U and 40L in one, two, or each of the low band, midband, and high band, for example. If desired, control circuitry 28 may toggle the switching circuitry over time to switch wireless circuitry 34 between a first mode in which antennas 40-1, 40-2, 40-3, and 40-4 perform 2×MIMO operations in the low band and 4×MIMO operations in the midband and/or high band and a second mode in which antennas 40-1, 40-2, 40-3, and 40-4 are configured to form antennas 40U and 40L that perform 2×MIMO operations in the low band, midband, and/or high band.

If desired, wireless communications circuitry 34 may convey wireless data with multiple antennas on one or more external devices (e.g., multiple wireless base stations) in a scheme sometimes referred to as carrier aggregation. When operating using a carrier aggregation scheme, the same antenna 40 may convey radio-frequency signals with multiple antennas (e.g., antennas on different wireless base stations) at different respective frequencies (sometimes referred to herein as carrier frequencies, channels, carrier channels, or carriers). For example, antenna 40-1 may receive radio-frequency signals from a first wireless base station at a first frequency (e.g., a frequency in low band LB), from a second wireless base station at a second frequency (e.g., a frequency in midband MB), and a from a third base station at a third frequency (e.g., a frequency in high band HB). The received signals at different frequencies may be simultaneously processed (e.g., by transceiver 38-1) to increase the communications bandwidth of transceiver 38-1, thereby increasing the data rate of transceiver 38-1. If desired, antenna 40-1 may convey radio-frequency signals with more than three base stations (e.g., using more than one frequency in low band LB, midband MB, and/or high band HB). Similarly, antenna 40-4 may perform carrier aggregation at two, three, or more than three frequencies within bands LB, MB, and/or HB, and antennas 40-2 and 40-3 may perform carrier aggregation at two or more frequencies within bands MB and/or HB. This may serve to further increase the overall data throughput of wireless circuitry 34 relative to scenarios where no carrier aggregation is performed. For example, the data throughput of circuitry 34 may increase for each carrier frequency (e.g., each carrier frequency within bands LB, MB, and HB) that is used (e.g., for each wireless base station that communicates with each of antennas 40-1, 40-2, 40-3, and 40-4).

By performing communications using both a MIMO scheme and a carrier aggregation scheme, the data throughput of wireless circuitry 34 may be even greater than in scenarios where either a MIMO scheme or a carrier aggregation scheme is used. The data throughput of circuitry 34 may, for example, increase for each carrier frequency that is used by antennas 40 (e.g., each carrier frequency may contribute 40 megabits per second (Mb/s) or some other throughput to the total throughput of circuitry 34). As one example, antennas 40-1 and 40-4 may perform carrier aggregation across three frequencies within each of bands LB, MB, and HB and antennas 40-3 and 40-4 may perform carrier aggregation across three frequencies within each of bands MB and HB. At the same time, antennas 40-1 and 40-4 may perform 2×MIMO operations in low band LB using and antennas 40-1, 40-2, 40-3, and 40-4 may perform 4×MIMO operations in one of bands MB and HB. In this scenario, with an exemplary throughput of 40 Mb/s per carrier frequency, wireless circuitry 34 may exhibit a throughput of approximately 960 Mb/s. If 4×MIMO operations are performed in both bands MB and HB by antennas 40-1, 40-2, 40-3, and 40-4, circuitry 34 may exhibit an even greater throughput of approximately 1200 Mb/s. In other words, the data throughput of wireless circuitry 34 may be increased from the 40 Mb/s associated with conveying signals at a single frequency with a single antenna to approximately 1 gigabits per second (Gb/s) by performing communications using MIMO and carrier aggregation schemes using four antennas 40-1, 40-2, 40-3, and 40-4.

These examples are merely illustrative and, if desired, carrier aggregation may be performed in fewer than three carriers per band, may be performed across different bands, or may be omitted for one or more of antennas 40-1 through 40-4. The example of FIG. 4 is merely illustrative. If desired, antennas 40 may cover any desired number of frequency bands at any desired frequencies. More than four antennas 40 or fewer than four antennas 40 may perform MIMO and/or carrier aggregation operations at non-near-field communications frequencies if desired.

Antennas 40 may include slot antenna structures, inverted-F antenna structures (e.g., planar and non-planar inverted-F antenna structures), loop antenna structures, combinations of these, or other antenna structures.

Figure 5:
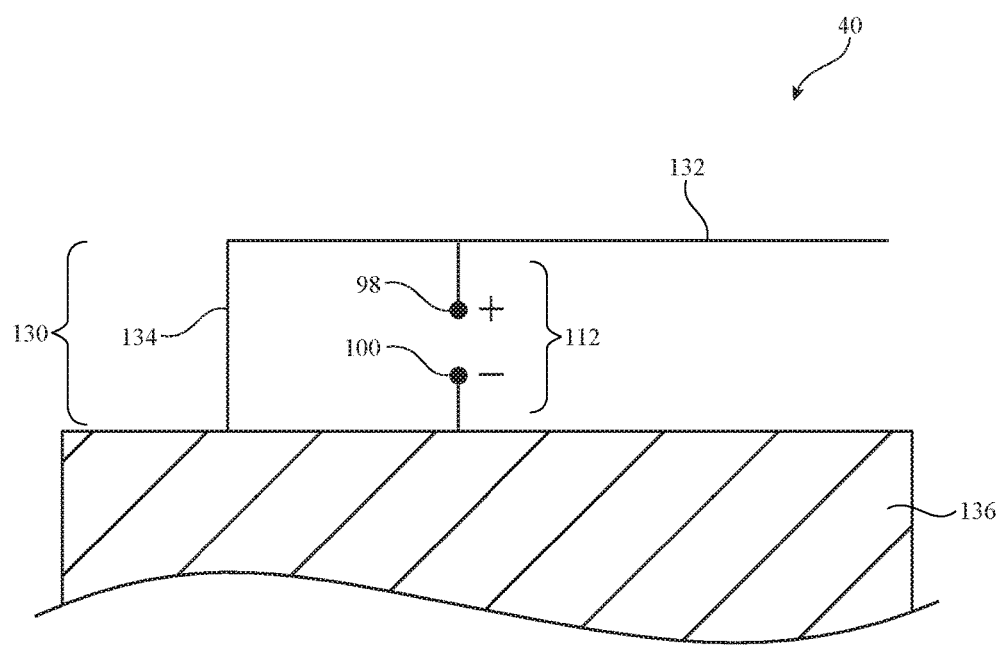
FIG. 5 is a schematic diagram of an illustrative inverted-F antenna in accordance with an embodiment.

An illustrative inverted-F antenna structure is shown in FIG. 5. Inverted-F antenna structure 40 of FIG. 5 has antenna resonating element 130 (sometimes referred to herein as antenna radiating element 130) and antenna ground 136 (sometimes referred to herein as ground plane 136 or ground 136). Antenna resonating element 130 may have a main resonating element arm such as arm 132. The length of arm 132 may be selected so that antenna structure 40 resonates at desired operating frequencies. For example, the length of arm 132 (or a branch of arm 132) may be a quarter of a wavelength at a desired operating frequency for antenna 40. Antenna structure 40 may also exhibit resonances at harmonic frequencies. If desired, slot antenna structures or other antenna structures may be incorporated into an inverted-F antenna such as antenna 40 of FIG. 5 (e.g., to enhance antenna response in one or more communications bands).

Main resonating element arm 132 may be coupled to ground 136 by return path 134. Antenna feed 112 may include positive antenna feed terminal 98 and ground antenna feed terminal 100 and may run parallel to return path 134 between arm 132 and ground 136. If desired, inverted-F antenna structures such as illustrative antenna structure 40 of FIG. 5 may have more than one resonating arm branch (e.g., to create multiple frequency resonances to support operations in multiple communications bands) or may have other antenna structures (e.g., parasitic antenna resonating elements, tunable components to support antenna tuning, etc.). For example, arm 132 may have left and right branches that extend outwardly from feed 112 and return path 134. Multiple feeds may be used to feed antennas such as antenna 40. Arm 132 may follow any desired path having any desired shape (e.g., curved and/or straight paths, meandering paths, etc.). If desired, antennas such as inverted-F antenna 40 of FIG. 5 may include tunable components such as components 102 of FIG. 3 (e.g., coupled between different portions of arm 132, between arm 132 and ground 136, etc.).

Figure 6:
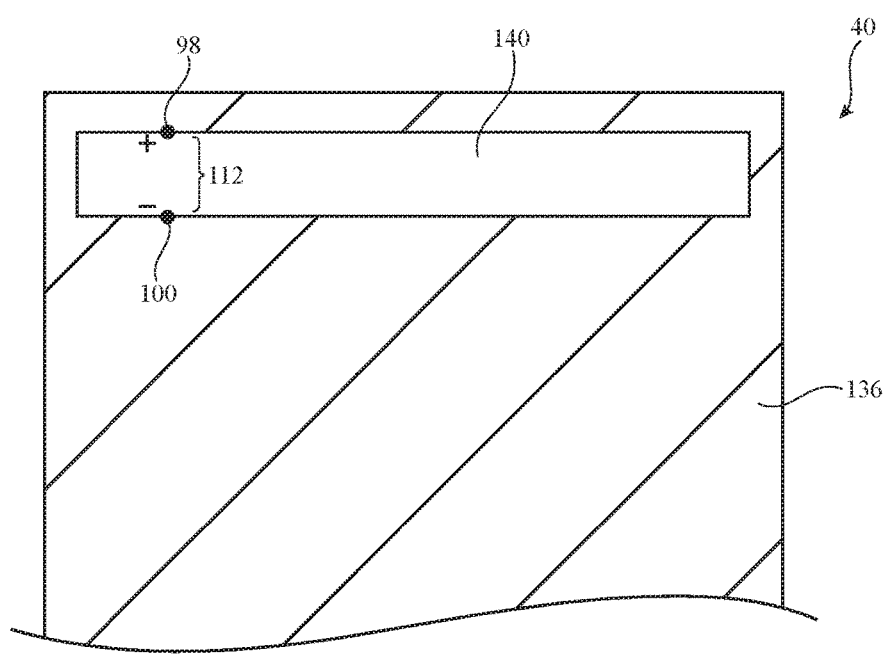
FIG. 6 is a schematic diagram of an illustrative slot antenna in accordance with an embodiment.

Antenna 40 may be a hybrid antenna that includes one or more slot elements. As shown in FIG. 6, for example, antenna 40 may be based on a slot antenna configuration having an opening such as slot 140 that is formed within conductive structures such as antenna ground 136. Slot 140 may be filled with air, plastic, and/or other dielectric. The shape of slot 140 may be straight or may have one or more bends (i.e., slot 140 may have an elongated shape following a meandering path). Feed terminals 98 and 100 may, for example, be located on opposing sides of slot 140 (e.g., on opposing long sides). Slot 140 may sometimes be referred to herein as slot element 140, slot antenna resonating element 140, slot antenna radiating element 140, or slot 140. Slot-based antenna resonating elements such as slot element 140 of FIG. 7 may give rise to an antenna resonance at frequencies in which the wavelength of the antenna signals is equal to the perimeter of the slot. In narrow slots, the resonant frequency of a slot antenna resonating element is associated with signal frequencies at which the slot length is approximately equal to a half of a wavelength of operation.

Slot antenna frequency response can be tuned using one or more tuning components (e.g., components 102 of FIG. 3). These components may have terminals that are coupled to opposing sides of the slot (i.e., the tunable components may bridge the slot). If desired, tunable components may have terminals that are coupled to respective locations along the length of one of the sides of slot 140. Combinations of these arrangements may also be used. If desired, antenna 40 may be a hybrid slot-inverted-F antenna that includes resonating elements of the type shown in both FIG. 5 and FIG. 6 (e.g., having resonances given by both a resonating element arm such as arm 132 of FIG. 5 and a slot such as slot 140 of FIG. 6).

The example of FIG. 6 is merely illustrative. In general, slot 140 may have any desired shape (e.g., shapes with straight and/or curved edges), may follow a meandering path, etc. If desired, slot 140 may be an open slot having one or more ends that are free from conductive material (e.g., where slot 140 extends through one or more sides of ground 136). Slot 140 may, for example, have a length approximately equal to one-quarter of the wavelength of operation in these scenarios.

Figure 7:
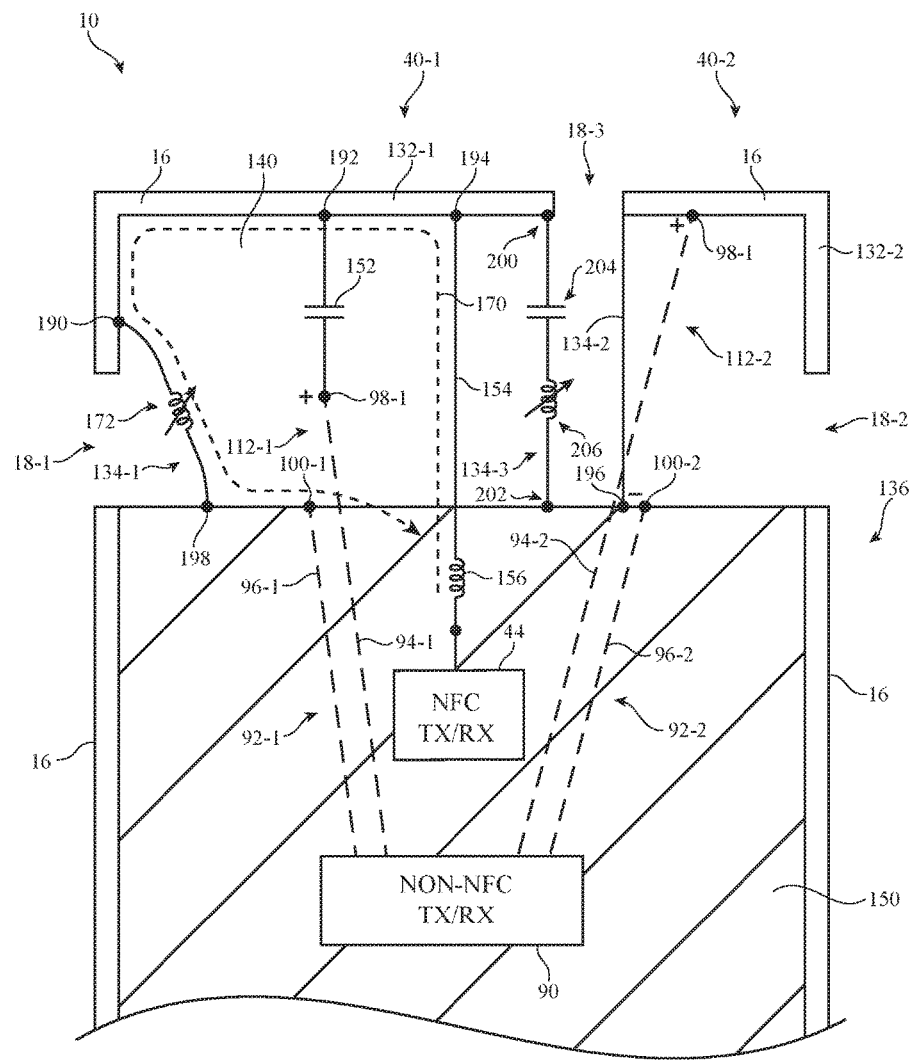
FIG. 7 is a top view of illustrative antenna structures in an electronic device that can be used to handle both non-near-field communications under a MIMO scheme and near-field communications in accordance with an embodiment.

While the examples of FIGS. 5 and 6 show only a single antenna 40, multiple antennas 40 may be formed from these structures within device 10. A top interior view of an illustrative portion of device 10 that contains antennas 40-1 and 40-2 is shown in FIG. 7. As shown in FIG. 7, device 10 may have peripheral conductive housing structures such as peripheral conductive housing structures 16. Peripheral conductive housing structures 16 may be segmented by dielectric-filled gaps (e.g., plastic gaps) 18 such as a first gap 18-1, a second gap 18-2, and a third gap 18-3. Each of gaps 18-1, 18-2, and 18-3 may be formed within peripheral structures 16 along respective sides of device 10.

As shown in FIG. 7, antennas 40-1 and 40-2 may include inverted-F antenna structures (e.g., inverted-F antenna structures as shown in FIG. 5). Antenna 40-1 may include a resonating element arm 132-1 coupled to ground 136 by return path 134-1. Antenna 40-1 may be fed using a first antenna feed 112-1. Antenna feed 112-1 may have a positive antenna feed terminal 98-1 coupled to point 192 on resonating element arm 132-1 and a ground antenna feed terminal 100-1 coupled to ground 136. Antenna 40-2 may include a resonating element arm 132-2 coupled to ground 136 by return path 134-2. Antenna 40-2 may be fed using a second antenna feed 112-2 having a positive antenna feed terminal 98-2 coupled to resonating element arm 132-2 and a ground antenna feed terminal 100-2 coupled to ground 136.

Figure 8:
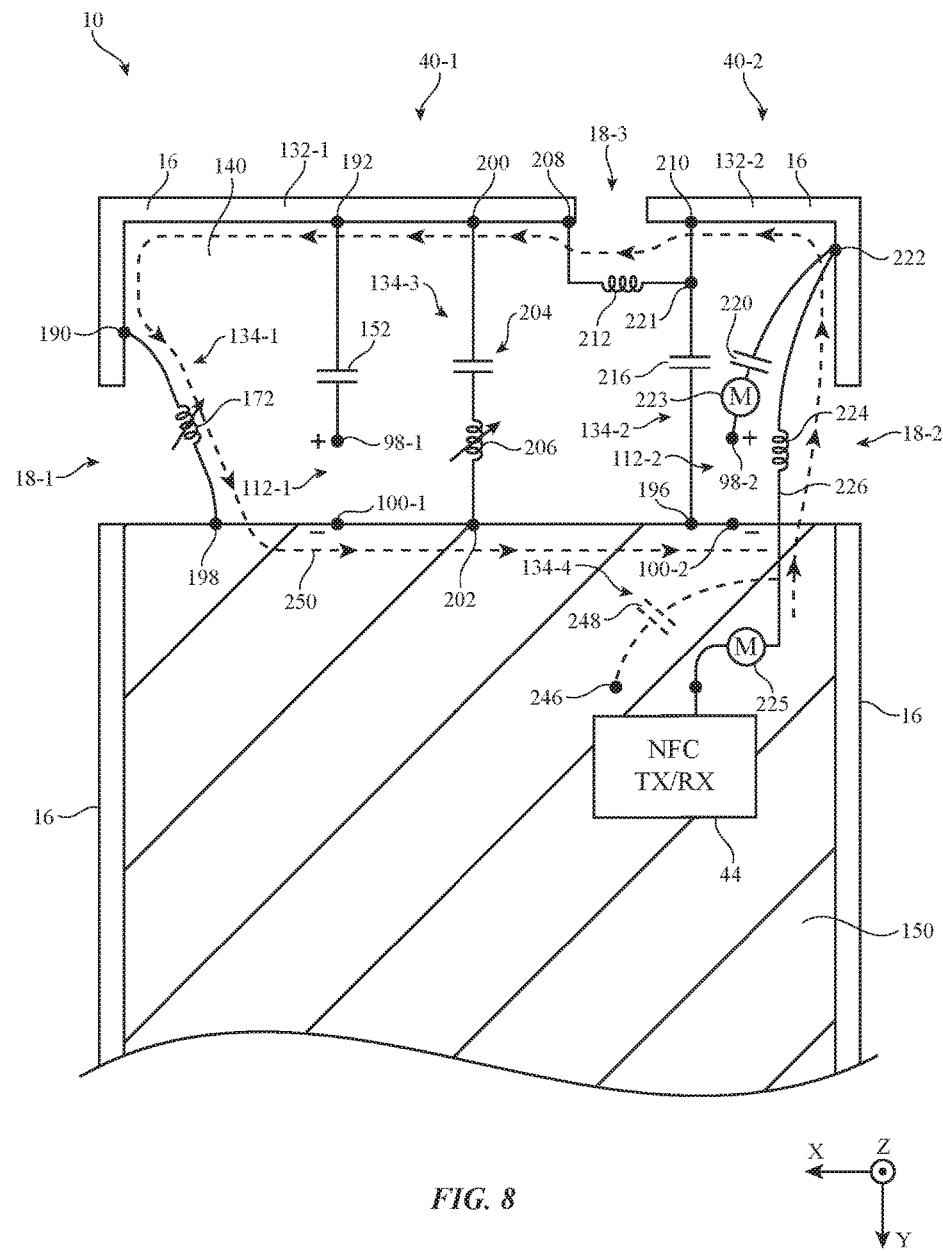
FIG. 8 is a top view of illustrative antenna structures in an electronic device that can be used to handle both MIMO non-near-field communications and near-field communications across an entire width of the device in accordance with an embodiment.

In the example of FIG. 8, return path 134-1 of antenna 40-1 may be coupled between point 190 on resonating element arm 132-1 and point 198 on ground 136. Point 190 may be interposed between point 192 and gap 18-1. Point 192 may be interposed between point 190 and gap 18-3. Point 198 on ground 136 may be interposed between ground feed terminal 100-1 and gap 18-1. Similarly, feed terminal 98-2 of antenna 40-2 may be coupled to resonating element arm 132-2 of antenna 40-2 at a location between gaps 18-3 and 18-2. Return path 134-2 of antenna 40-2 may be formed at gap 18-3 or may be coupled to a location along arm 132-2 that is interposed between gap 18-3 and feed terminal 98-1. Return path 134-2 may be coupled to point 196 on ground 136. Ground feed terminal 100-2 may be interposed between point 196 on ground 136 and gap 18-2.

Radio-frequency signals may be conveyed to and from antenna 40-1 over feed 112-1. Feed 112-1 may be coupled to non-near-field communications transceiver (TX/RX) circuitry 90 over transmission line 92-1. For example, positive conductor 94-1 of transmission line 92-1 may be coupled to feed terminal 98-1 whereas ground conductor 96-1 of transmission line 92-1 may be coupled to feed terminal 100-1. If desired, matching circuitry (e.g., impedance matching circuitry in a front end circuit such as front end circuit 128-1 of FIG. 4) may be interposed on transmission line 92-1.

Radio-frequency signals may be conveyed to and from antenna 40-2 over feed 112-2. Feed 112-2 may be coupled to non-near-field communications transceiver (TX/RX) circuitry 90 over transmission line 92-2 (e.g., transmission lines 92-1 and 92-2 may be coupled to respective ports on transceiver circuitry 90 or may be coupled to separate transceivers such as transceivers 38-1 and 38-2 as shown in FIG. 4). For example, positive conductor 94-2 of transmission line 92-2 may be coupled to feed terminal 98-2 whereas ground conductor 96-2 of transmission line 92-2 may be coupled to feed terminal 100-2. If desired, matching circuitry (e.g., impedance matching circuitry in a front end circuit such as front end circuit 128-2 of FIG. 4) may be interposed on transmission line 92-2.

An opening such as slot 140 may separate arms 132-1 and 132-2 from ground 136. If desired, slot 140 may contribute slot antenna resonances to antennas 40-1 and/or 40-2 (e.g., antennas 40-1 and 40-2 may be hybrid slot-inverted-F antennas including resonating elements of the types shown in both FIGS. 5 and 6).

Slot 140 may be formed from an elongated opening extending from gap 18-1 to gap 18-2 (e.g., the ends of slot 140, which may sometimes be referred to as open ends, may be formed by gaps 18-1 and 18-2). Slot 140 may have an elongated shape having any suitable length (e.g., about 4-20 cm, more than 2 cm, more than 4 cm, more than 8 cm, more than 12 cm, less than 25 cm, less than 10 cm, etc.) and any suitable width (e.g., approximately 2 mm, less than 2 mm, less than 3 mm, less than 4 mm, 1-3 mm, etc.). Gap 18-3 may be continuous with and extend perpendicular to a portion of slot 140 along the longitudinal axis of slot 140. Slot 140 may be filled with dielectric such as air, plastic, ceramic, or glass. For example, plastic may be inserted into portions of slot 140 and this plastic may be flush with the outside of housing 12. Dielectric material in slot 140 may lie flush with dielectric material in gaps 18-1, 18-2, and 18-3 at the outside of housing 12 if desired. The example of FIG. 7 is merely illustrative. If desired, slot 140 may have any other desired shapes (e.g., a U-shape having segments extending along three sides of device 10 and surrounding an extended portion of ground 136, shapes having curved and/or straight edges, etc.).

As shown in FIG. 7, resonating element arm 132-1 of antenna 40-1 and resonating element arm 132-2 of antenna 40-2 may be formed from respective segments of peripheral conductive housing structures 16. The segment of peripheral conductive housing structures 16 forming resonating element arm 132-1 may extend between dielectric gap 18-1 at a first (left) side of device 10 and third dielectric gap 18-3 at a second (top) side of device 10. The segment of peripheral conductive housing structures 16 forming resonating element arm 132-2 may extend between dielectric gap 18-3 and dielectric gap 18-2 at a third second (right) side of device 10.

Antenna ground 136 may be formed from conductive housing structures, from electrical device components in device 10, from printed circuit board traces, from strips of conductor such as strips of wire and metal foil, from conductive portions of display 14 (e.g., a conductive frame for display 14 or a conductive back panel for display 14), and/or other conductive structures. In one suitable arrangement, ground 136 is formed from conductive portions of housing 12 such as conductive housing layer 150 and the segments of peripheral conductive housing structures 16 that are separated from arm 132-1 by peripheral gap 18-1 and from arm 132-2 by peripheral gap 18-2. Conductive housing layer 150 may form the conductive rear wall of device 10, as an example. Conductive housing layer 150 may form an exterior surface of device 10 or may be covered with (e.g., formed over) a thin dielectric layer such as a glass, sapphire, plastic, or ceramic layer that covers conductive housing layer 150 and serves to hide layer 150 from view (e.g., where the dielectric layer forms the exterior surface of device 10).

Conductive housing layer 150 (sometimes referred to herein as ground layer 150 or conductive layer 150) may have any desired shape within device 10. For example, ground layer 150 may align with gaps 18-1 and 18-2 in peripheral conductive hosing structures 16 (e.g., the lower edge of gap 18-1 may be aligned with the edge of ground layer 150 defining slot 140 adjacent to gap 18-1 such that the lower edge of gap 18-1 is approximately collinear with the edge of ground layer 150 at the interface between ground layer 150 and the portion of peripheral conductive structures 16 adjacent to gap 18-1). This example is merely illustrative and, in another suitable arrangement, ground layer 150 may have an additional vertical slot adjacent to gap 18-1 that extends below gap 18-1 (e.g., along the Y-axis of FIG. 7). Similarly, if desired, ground layer 150 may include a vertical slot adjacent to gap 18-2 that extends beyond the lower edge of gap 18-2 (e.g., in the direction of the Y-axis of FIG. 7). Such vertical slots may, for example, have two edges that are defined by ground layer 150 and one edge that is defined by peripheral conductive structures 16. The vertical slots may have open ends defined by an open end of slot 140 at gaps 18-2 and 18-1. The vertical slots may have any desired length extending beyond gaps 18-1 and 18-2 along the Y-axis of FIG. 7 (e.g., 10-15 mm, more than 5 mm, more than 10 mm, more than 15 mm, more than 30 mm, less than 30 mm, less than 20 mm, less than 15 mm, less than 10 mm, between 5 and 20 mm, etc.) and may have any desired perpendicular width (e.g., about 2 mm, less than 4 mm, less than 3 mm, less than 2 mm, less than 1 mm, more than 0.5 mm, more than 1.5 mm, more than 2.5 mm, 1-3 mm, etc.).

The length of antenna resonating element arms 132-1 and 132-2 may be selected so that antennas 40-1 and 40-2 resonate at desired frequencies such as frequencies in a low band LB (e.g., a frequency band between about 600 MHz and 960 MHz), in a midband MB (e.g., a frequency band between about 1700 MHz and 2200 MHz), and a high band HB (e.g., a frequency and between about 2300 MHz and 2700 MHz).

In one suitable arrangement, the frequency response of antenna 40-1 in midband MB may be associated with the distance along arm 132-1 between return path 134-1 and feed 112-1. The frequency response of antenna 40-1 in low band LB may be associated with the distance along arm 132-1 between feed 112-1 and gap 18-3, for example. The frequency response of antenna 40-2 in midband MB may be associated with the distance along arm 132-2 between return path 134-2 and gap 18-2, for example. A portion of slot 140 between arm 132-1 and ground 136 and/or harmonics of arm 132-1 may contribute to the frequency response of antenna 40-1 in high band HB. A portion of slot 140 between arm 132-2 and ground 136 and/or harmonics of arm 132-2 may contribute to the frequency response of antenna 40-2 in high band HB.

Antenna tuning components (e.g., components 102 of FIG. 3) may be coupled to antenna 40-1. For example, an inductive component such as adjustable inductor 172 may be interposed in return path 134-1 between arm 132-1 and ground 136. Adjustable inductor 172 may, for example, be controlled to adjust the frequency response of antenna 40-1 in midband MB and/or high band HB (e.g., using control signals provided by control circuitry 28 as shown in FIG. 3). In this example, adjustable inductor 172 may include a set of fixed inductors coupled to ground 136 by switching circuitry. For example, adjustable inductor 172 may include a single fixed inductor coupled to ground 136 by a single-pole single-throw (SPST) switch or may include multiple fixed inductors coupled to ground 136 by a single-pole double-throw (SP2T) switch. This example is merely illustrative and, if desired, inductor 172 may be fixed.

Antenna 40-1 may have an additional return path 134-3 coupled between point 200 on arm 132-1 and point 202 on ground 136. Point 200 may, for example, be interposed between point 192 and gap 18-3. Point 202 may be interposed between ground terminal 100-1 and point 196. A filter such as a frequency-dependent circuit based on capacitor 204 (e.g., a capacitor having a capacitance of about 20-30 pF) may be interposed on return path 134-3. An inductive circuit such as adjustable inductor 206 may be interposed on return path 134-3 between capacitor 204 and ground 136. Adjustable inductor 206 may, for example, include a set of fixed inductors coupled between capacitor 204 and point 202 by switching circuitry such as a single-pole four-throw (SP4T) switch. The switch may be adjusted to change the inductance coupled between points 200 and 202 to tune the frequency response of antenna 40-1 in low band LB.

If desired, antenna tuning components (e.g., components 102 of FIG. 3) may be coupled between arm 132-2 and ground 136 for adjusting the frequency response of antenna 40-2 in midband MB and/or high band HB. For example, adjustable inductor circuitry or other circuitry may be interposed in return path 134-2. The example of FIG. 7 is merely illustrative. In general, any desired adjustable tuning components having any desired switching circuitry, resistive, capacitive, and/or inductive components may be included in antennas 40-1 and 40-2.

When configured in this way, both antennas 40-1 and 40-2 may support communications in midband MB and high band HB whereas antenna 40-1 also supports communications in low band LB. Antennas 40-1 and 40-2 may therefore both perform communications using a MIMO scheme in midband MB and/or high band HB, if desired (e.g., a 2×MIMO scheme in midband MB and/or high band HB using only antennas 40-1 and 40-2 or a 4×MIMO scheme in midband MB and/or high band HB together with antennas 40-3 and 40-4 of FIG. 3). When performing MIMO operations (e.g., 4×MIMO operations) within the same frequency band (e.g., within midband MB or high band HB), if care is not taken, antenna currents from antenna 40-1 can electromagnetically interact with antenna currents from antenna 40-2, thereby deteriorating radio-frequency performance by both antennas.

However, as shown in FIG. 7, the mechanical separation between arms 132-1 and 132-2 provided by gap 18-3 may serve to electromagnetically isolate antenna 40-1 from antenna 40-2 when antennas 40 operate at the same frequency (e.g., while performing communications using a MIMO scheme). Forming return path 134-2 adjacent to gap 18-3 may serve to further isolate arms 132-1 and 132-2. In this way, antenna 40-1 may be sufficiently isolated from antenna 40-2 despite both antennas operating at the same frequencies. At the same time, antenna 40-1 may, if desired, perform 2×MIMO operations in low band LB with other antennas in device 10 (e.g., with antenna 40-4 as shown in FIG. 3). While the example of FIG. 7 describes adjacent antennas 40-1 and 40-2, similar antenna structures may be used in forming antennas 40-3 and 40-4 at the lower end of device 10 as shown in FIG. 4 (e.g., where antenna 40-4 replaces antenna 40-1 and antenna 40-3 replaces antenna 40-2 in FIG. 7).

To support near-field communications in device 10, device 10 preferably includes a near-field communications antenna. Space can be conserved by using some or all of antennas 40-1 and/or 40-2 as both a cellular telephone antenna or other non-near-field communications antenna and as a near-field communications antenna. As an example, a near-field communications antenna for device 10 (e.g., an antenna that is used by near-field communications transceiver circuitry 44) may be formed using portions of antenna 40-1 of FIG. 7 such as portions of resonating element arm 132-1, return path 134-1, and ground 136. By sharing conductive antenna structures between both near-field and non-near-field antennas, duplicative conductive structures can be minimized and antenna volume can be conserved within device 10.

As shown in FIG. 7, a near-field communications antenna for device 10 may be formed from antenna 40-1 such as portions of inverted-F antenna resonating element arm 132-1, return path 134-1, and ground 136. The non-near-field communications antenna formed from antenna 40-1 may be fed using an antenna feed such as feed 112-1. Non-near-field communications transceiver circuitry 90 may handle wireless communications using feed 112-1 in frequency bands such as low band LB, midband MB, high band HB, a low-midband from 960 to 1710 MHz, an ultra-high band from 3400 to 3700 MHz, 2.4 GHz and 5 GHz bands for Wi-Fi® (IEEE 802.11) communications, a 1575 MHz band for GPS signals, and/or other non-near-field communications bands.

In order to support near-field communications using antenna 40-1, near-field communications transceiver circuitry 44 (NFC TX/RX) may transmit and/or receive near-field communications signals (e.g., signals in a near-field communications band such as a 13.56 MHz near-field communications band). Near-field communications transceiver circuitry 44 may be coupled to antenna 40-1 using a conductive path such as path 154. Path 154 may be coupled to point 194 on arm 132-1. Point 194 may be interposed between point 192 and gap 18-3. Path 154 may, for example, be a single-ended transmission line signal path for conveying single-ended near-field communications signals. In this scenario, near-field communications transceiver circuitry 44 may include balun circuitry or other circuitry for converting the single-ended signals into differential signals and for converting differential signals into the single-ended signals.

A filter such as a frequency-dependent circuit based on inductor 156 (e.g., an inductor having a value of 80 nH to 200 nH) or other suitable frequency-dependent circuit may couple arm 132-1 of antenna 40-1 to near-field communications transceiver circuitry 44. If desired, impedance matching circuitry may be interposed between inductor 156 and the balun in circuitry 44 or the balun in circuitry 44 may be interposed between inductor 156 and impedance matching circuitry.

A filter such as a frequency-dependent circuit based on capacitor 152 (e.g., a capacitor having a capacitance of about 20-30 pF) may be coupled between feed terminal 98-1 and point 192 on arm 132-1. The frequencies of the signals associated with non-near-field communications transceiver circuitry 90 are typically 600 MHz or greater. At these frequencies, inductor 156 forms an open circuit that electrically isolates arm 132-1 and antenna 40-1 from near-field communications transceiver circuitry 44. Capacitor 152 may form a short circuit at these frequencies, so that feed terminal 98-1 is coupled to arm 132-1 and antenna 40-1 serves as an inverted-F antenna for non-near-field communications transceiver circuitry 90. Capacitor 204 may also form a short circuit at these frequencies so that point 200 is coupled to point 202 and adjustable inductor 206 can perform frequency adjustments for antenna 40-1 in low band LB.

Near-field communications transceiver circuitry 44 may operate at lower frequencies (e.g., at 13.56 MHz). At near-field communications frequencies, capacitor 152 forms an open circuit, isolating the path containing capacitor 152 (i.e., feed terminal 98-1) from near-field communications signal currents. Similarly, capacitor 204 forms an open circuit at these frequencies, isolating point 202 from point 200. Inductor 156 may form a short circuit at near-field communications frequencies, so near-field communications signal currents such as illustrative near-field communications current 170 can flow through a conductive path formed from portions of antenna 40-1 (e.g., a conductive loop path that forms a loop antenna resonating element of a near-field communications loop antenna). Current 170 may, for example, flow in a loop through path 154, the portion of arm 132-1 between points 194 and 190, return path 134-1, and ground 136. Current 170 may be isolated from arm 132-2 and return path 134-2 of antenna 40 by gap 18-3 in peripheral conductive structures 16. Current 170 may produce corresponding wireless near-field communications signals that are transmitted by device 10 and/or may be produced in response to wireless near-field communications signals that are received by device 10, for example.

As this example demonstrates, the antenna structures for antenna 40-1 of FIG. 7 can serve both as non-near-field communications antenna structures (i.e., an inverted-F antenna) and as near-field communications antenna structures (i.e., a loop antenna formed from portions of antenna structures 40-1). The ability to share antenna structures between both near-field and non-near-field functions allows the size of the antennas in device 10 to be minimized and avoids duplication of antenna parts.

The example of FIG. 7 is merely illustrative. If desired, near-field communications transceiver circuitry 44 may be coupled to antenna 40-2 and portions of antenna 40-2 may form a near-field communications loop antenna. However, in general, it may be desirable for the near-field communications loop antenna to occupy as much space as possible (e.g., as much of the width of device 10 along the X-axis of FIG. 7 as possible). This may, for example, facilitate the use of device 10 for a user who is using device 10 to communicate with external near-field communications equipment such as an RFID reader (e.g., so that the user does not have to focus on precisely placing device 10 over the RFID reader so that the antenna volume is aligned with the RFID reader). Because antenna 40-2 occupies less volume than antenna 40-1 (e.g., because antenna 40-2 does not cover low band LB), forming a near-field communications loop from antenna 40-2 may undesirably increase the difficulty of operating device 10 for a user. If desired, even more of the width of device 10 may be utilized in forming the near-field communications loop antenna by forming the near-field communications loop antenna using portions of both antennas 40-1 and 40-2.

FIG. 8 is a top-down diagram of device 10 having a near-field communications antenna formed from portions of both antennas 40-1 and 40-2. As shown in FIG. 8, feed terminal 98-2 of feed 112-2 may be coupled to point 222 on arm 132-2. Point 222 may be interposed between gaps 18-3 and 18-2. A filter such as a frequency-dependent circuit based on capacitor 220 (e.g., a capacitor having a capacitance of about 20-30 pF) may be interposed between feed terminal 98-2 and point 222 on arm 132-2. If desired, an impedance matching circuit such as matching (M) circuit 223 may be interposed between feed terminal 98-2 and capacitor 220. Matching circuit 223 may serve to match the impedance of the transmission line for antenna 40-2 (e.g., transmission line 92-2 as shown in FIGS. 4 and 7) to the impedance of antenna 40-2 at non-near-field communications frequencies.

A filter such as a frequency-dependent circuit based on capacitor 216 (e.g., a capacitor having a capacitance of about 20-30 pF) may be interposed on return path 134-2 of antenna 40-2. Capacitor 216 may be coupled to point 210 on arm 132-2 through circuit node 221. Point 210 may be located at the edge of gap 18-3, may be adjacent to gap 18-3, or may be at any other desired location between gap 18-3 and point 222.

Near-field communications transceiver circuitry 44 may be coupled to peripheral conductive structures 16 using a conductive path such as path 226. Path 226 may be coupled to point 222 on arm 132-1. This is merely illustrative and, in other suitable arrangements, path 226 may be coupled to other desired locations on arm 132-2 (e.g., feed 112-1 and path 226 need not be coupled to the same point on arm 132-2). Path 226 may, for example, be a single-ended transmission line signal path for conveying single-ended near-field communications signals. In this scenario, near-field communications transceiver circuitry 44 may include balun circuitry or other circuitry for converting the single-ended signals into differential signals and for converting differential signals into the single-ended signals.

A filter such as a frequency-dependent circuit based on inductor 224 (e.g., an inductor having a value of 80 nH to 200 nH) or other suitable frequency-dependent circuit may couple arm 132-2 of antenna 40-2 to near-field communications transceiver circuitry 44. If desired, impedance matching circuitry such as impedance matching circuitry 225 may be interposed between inductor 224 and the balun in circuitry 44. In another suitable arrangement, the balun in circuitry 44 may be interposed between inductor 224 and impedance matching circuitry 225. Impedance matching circuitry 225 may ensure that path 226 and circuitry 44 is impedance matched to antenna 40-2 at near-field communications frequencies.

If desired, an optional filter such as a frequency-dependent circuit based on capacitor 248 (e.g., a capacitor having a capacitance value of 20-30 pF) or other suitable frequency-dependent circuit may couple path 226 to point 246 on ground 136. Capacitor 248 may, for example, be coupled to a point on path 226 that is interposed between inductor 224 and near-field communications transceiver circuitry 44 (e.g., capacitor 248 may be coupled to the side of inductor 224 coupled to near-field communications transceiver circuitry 44).

In order to maximize the volume of the near-field communications loop antenna for device 10, arm 132-1 of antenna 40-1 may be coupled to arm 132-2 of antenna 40-2 by a conductive path bridging gap 18-3. For example, a filter such as a frequency-dependent circuit based on inductor 212 (e.g., an inductor having a value of 80 nH to 200 nH) or other suitable frequency-dependent circuit may couple arm 132-1 of antenna 40-1 to arm 132-2 of antenna 40-2 (e.g., inductor 212 may bridge gap 18-3 and may couple the end of arm 132-1 adjacent to gap 18-3 to the end of arm 132-2 adjacent to gap 18-3). In one suitable arrangement, inductor 212 may be coupled between point 208 on arm 132-1 and circuit node 221. Point 208 may be located at the edge of arm 132-1 defined by gap 18-3, may be located adjacent to gap 18-3, or may be located at any desired point between point 200 and gap 18-3. Inductor 212 may be coupled directly to node 210 or to a point on arm 132-2 between point 210 and edge 18-3 in other suitable arrangements. If desired, an additional inductor may be interposed on return path 134-2 between point 210 and circuit node 221 (e.g., to ensure that antennas 40-1 and 40-2 are provided with desired impedance matching at near-field communications frequencies).

At the frequencies of the signals associated with antenna feeds 112-1 and 112-2 (e.g., non-near-field frequencies greater than 600 MHz associated with the non-near-field signals conveyed by non-near-field communications transceiver circuitry 90 of FIG. 7), inductor 224 forms an open circuit that electrically isolates arm 132-2 and antenna 40-2 from near-field communications transceiver circuitry 44 and inductor 212 forms an open circuit that electrically isolates arm 132-2 of antenna 40-2 from arm 132-1 of antenna 401. In this way, antennas 40-1 and 40-2 may be electromagnetically isolated by gap 18-3 at non-near-field communications frequencies.

Capacitors 152, 204, 216, and 220 may form short circuits at these frequencies so that feed terminal 98-2 is coupled to arm 132-2 and antenna 40-2 serves as an inverted-F antenna for the non-near-field communications transceiver circuitry and so that feed terminal 98-1 is coupled to arm 132-1 and antenna 40-1 serves as an inverted-F antenna for the non-near-field communications transceiver circuitry. At these frequencies, capacitor 204 may electrically couple point 200 on arm 132-1 to point 202 on ground 136 (e.g., forming return path 134-3 and enabling inductor 206 to affect the non-near-field frequency response of antenna 40-1). Switching circuitry in adjustable inductor 206 may be adjusted to tune the frequency response of antenna 40-1 within low band LB. If desired, switching circuitry in adjustable inductor 172 may be adjusted to tune the frequency response of antenna 40-1 within midband MB and/or high band HB. At these non-near-field communications frequencies, capacitor 216 may short point 210 on arm 132-2 to point 196 on ground 136, thereby shorting antenna currents at non-near-field communications frequencies to ground 136 over return path 134-2. Switching circuitry in antenna 40-2 may be adjusted to tune the frequency response of antenna 40-2 within midband MB and/or high band HB if desired.

In scenarios where optional capacitor 248 is coupled between path 226 and ground 136, inductor 224 may have a small enough inductance to pass non-near-field communications signals. Capacitor 248 may serve as a shunt capacitance that shorts non-near-field communications signals from point 222 to point 246 on ground 136, thereby isolating near-field communications transceiver circuitry 44 from the non-near-field communications signals. In this scenario, antenna 40-2 may have an additional return path 134-4 formed by capacitor 248 and inductor 224 may perform impedance matching for antenna 40-2 at non-near-field communications frequencies. In another suitable arrangement, inductor 224 may include adjustable inductor circuitry that is adjusted to tune the frequency response of antenna 40-2 in midband MB and/or high band HB.

At near-field communications frequencies, capacitors 152, 204, 216, 220, and 248 form open circuits. This may serve to isolate feed terminal 98-1, low band tuning inductor 206, and feed terminal 98-2 from near-field communications signal currents conveyed by near-field communications transceiver circuitry 44. Similarly, signals at near-field communications frequencies may be prevented from shorting to ground point 202 over path 134-3, from shorting to ground point 196 over return path 134-2, and from shorting to ground point 246 over return path 134-4. Inductors 172, 212, and 224 may form short circuits at near-field communications frequencies. In this way, near-field communications signal currents such as illustrative near-field communications current 250 can flow through a conductive path formed from portions of both antennas 40-1 and 40-2 (e.g., a conductive loop path that forms a loop antenna resonating element of a near-field communications loop antenna for device 10). Current 250 may, for example, flow in a loop through conductive path 224, the portion of arm 132-2 between points 222 and 210, across gap 18-3 through inductor 212, the portion of arm 132-1 between points 208 and 190, through return path 134-1, and through ground 136. Current 250 may produce corresponding wireless near-field communications signals that are transmitted by device 10 and/or may be produced in response to wireless near-field communications signals that are received by device 10, for example.

In this way, the near-field communications loop antenna formed by the conductive loop path of current 250 may extend across substantially all of the width of device 10 (e.g., across the lengths of both antennas 40-1 and 40-2). This may, for example, facilitate the use of device 10 for a user who is using device 10 to communicate with external near-field communications equipment such as an RFID reader (e.g., so that the user does not have to focus on precisely placing device 10 over the RFID reader so that the antenna volume is aligned with the RFID reader). At the same time, antennas 40-1 and 40-2 may handle radio-frequency communications at non-near-field communications frequencies in multiple bands (e.g., without the non-near-field communications signals interfering with near-field communications transceiver circuitry 44 or the near-field communications signals). Antennas 40-1 and 40-2 may, for example, perform MIMO communications at one or more of the same frequencies while maintaining satisfactory isolation between the antennas to maximize the data throughput of wireless communications circuitry 34.

The example of FIGS. 7 and 8 are merely illustrative. If desired, path 224 may be coupled to any desired location along arm 132-1 instead of a location along arm 132-2. Arms 132-1 and 132-2 may have any desired shape (e.g., following straight and/or curved paths) and may have additional branches if desired. Slot 140 may have any other desired shapes (e.g., a U-shape having segments extending along three sides of device 10 and surrounding an extended portion of ground 136, shapes having curved and/or straight edges, etc.). Point 190 may be interposed between points 192 and 200 or between points 200 and 208 if desired. Conductive path 226 may be coupled to arm 132-2 at a location between points 222 and 210 if desired. Point 222 may be interposed between gap 18-3 and point 210 if desired. While the example of FIG. 8 describes antennas 40-1 and 40-2, similar structures may be used to implement other antennas in device 10 if desired (e.g., antennas 40-3 and 40-4 of FIG. 4). Antennas 40-1 and 40-2 may cover any desired frequency bands. In another suitable arrangement, the segment of peripheral housing structure 16 forming arm 132-1 may be continuous with the segment of peripheral housing structure 16 forming arm 132-2 (e.g., gap 18-3 may be omitted). In this scenario, an additional return path for antenna 40-1 may be coupled between point 208 and ground 136 to optimize isolation between antennas 40-1 and 40-2 if desired.

Figure 9:
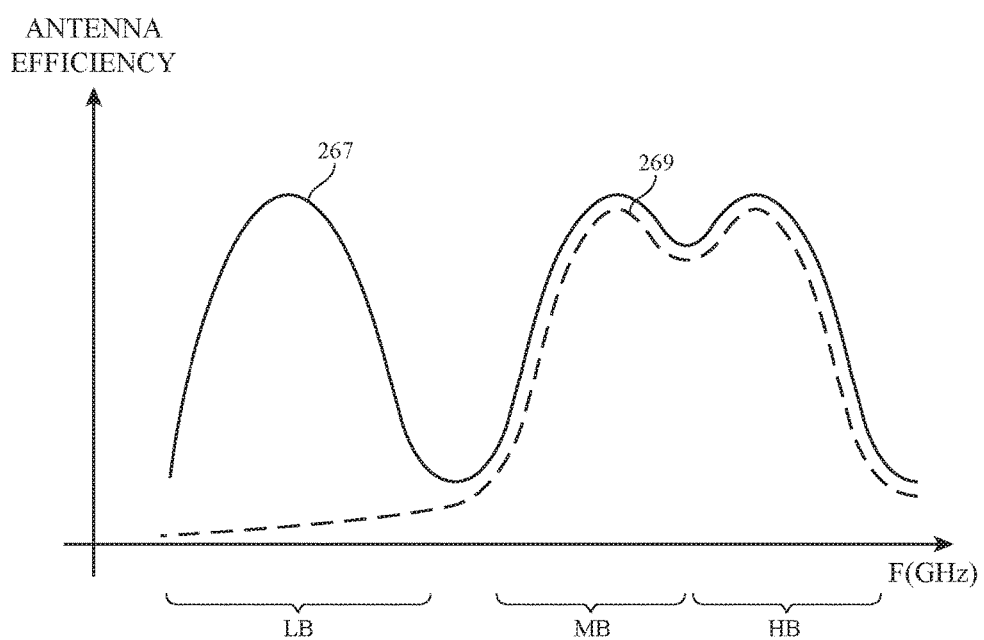
FIG. 9 is a plot of antenna performance (antenna efficiency) in non-near-field communications bands for antenna structures of the type shown in FIGS. 7 and 8 in accordance with an embodiment.

FIG. 9 is a graph in which non-near-field communications antenna performance (antenna efficiency) has been plotted as a function of operating frequency F for antennas 40-1 and 40-2 of FIGS. 7 and 8. As shown in FIG. 9, curve 267 plots the antenna efficiency of antenna 40-1 when operated at non-near-field communications frequencies. When operating at non-near-field communications frequencies, antenna 40-1 may exhibit peak efficiencies in low band LB, midband MB, and high band HB (e.g., peak efficiencies of approximately −3 dB). Curve 269 plots the antenna efficiency of antenna 40-2 when operating at non-near-field communications frequencies. When operating at non-near-field communications frequencies, antenna 40-2 may exhibit peak efficiencies in midband MB and high band HB. Antennas 40-1 and 40-2 may both exhibit satisfactory antenna efficiencies over the entirety of midband MB and high band HB even though antennas 40-1 and 40-2 both also form part of a near-field communications at near-field communications frequencies (e.g., due at least in part to the isolation provided by gap 18-3 of FIG. 8). Antennas 40-1 and 40-2 may thereby perform MIMO operations at one or more frequencies in midband MB and/or high band HB in addition to performing near-field communications, if desired.

Figure 10:
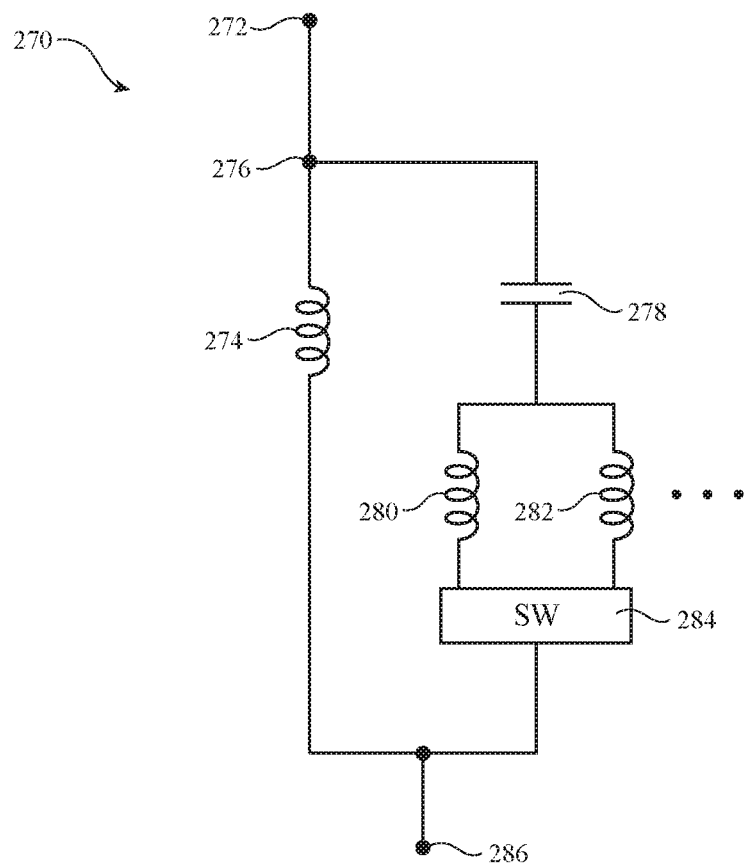
FIG. 10 is a circuit diagram of illustrative switchable inductor circuitry that may be used for tuning non-near-field communications in antenna structures of the type shown in FIGS. 7 and 8 in accordance with an embodiment.

FIG. 10 is a circuit diagram of one possible adjustable circuit that may be used for tuning the non-near-field frequency response of antennas 40-1 and/or 40-2. As shown in FIG. 10, wireless communications circuitry 34 may include an adjustable circuit 270 coupled between terminals 272 and 286. Circuit node 276 may be coupled to terminal 272. An inductor such as inductor 274 may be coupled between node 276 and terminal 286. Fixed inductors such as inductors 280 and 282 may be coupled to terminal 286 via switching circuitry such as switch 284 (e.g., an SP2T switch or other desired switches). Capacitor 278 may be coupled to node 276. Inductors 280 and 282 may be coupled in parallel between capacitor 278 and switch 284. Switch 284 may be adjusted to selectively couple none, one, or both of inductors 280 and 282 between capacitor 278 and terminal 286.

At near-field communications frequencies, capacitor 278 may form an open circuit. Inductor 274 may short terminal 272 to terminal 286 at near-field communications frequencies. If desired, inductor 274 may perform impedance matching for an antenna resonating element arm coupled to terminal 272 at non-near-field communications frequencies.

At non-near-field communications frequencies, capacitor 278 may form a short circuit between node 276 and inductors 280 and 282. Inductor 274 may be configured to form an open circuit or a short circuit at non-near-field communications frequencies. Capacitor 278 may thereby serve to short non-near-field communications signals to terminal 286 over one or both of inductors 280 and 282 (e.g., depending on the state of switch 284). Switch 284 may be adjusted to change the inductance between terminals 272 and 286 and to thereby tune the frequency response of the antenna resonating element arm coupled to terminal 272 at non-near-field communications frequencies. In this way, an adjustable component such as component 270 may serve as both a short circuit path for near-field communication signals and as a tuning component for non-near-field communications antennas.

As examples, component 270 of FIG. 10 may be used in place of adjustable inductor 172 of FIGS. 7 and 8 (e.g., where terminal 272 of component 270 is coupled to point 190 on arm 132-1 and terminal 286 of component 270 is coupled to ground point 198 as shown in FIG. 7), in place of return path 134-2 of FIG. 7 (e.g., where terminal 272 is coupled to arm 132-2 of antenna 40-2 and terminal 286 is coupled to ground point 196 as shown in FIG. 7), in place of return path 134-3 of FIG. 8 (e.g., where terminal 272 is coupled to point 200 on arm 132-1 and terminal 286 is coupled to ground point 202 as shown in FIG. 8), in place of inductor 224 of FIG. 8 (e.g., where terminal 272 is coupled to point 222 on arm 132-2 and terminal 286 is coupled to ground 136), or at any other desired location in antennas 40-1 and/or 40-2. The example of FIG. 10 is merely illustrative. If desired, component 270 may include more than two inductors coupled to switch 284. In general, component 270 may include any desired switches, inductors, and capacitors coupled in any desired manner between terminals 272 and 286.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing having a peripheral conductive wall;
   a dielectric-filled gap in the peripheral conductive wall that divides the peripheral conductive wall into first and second segments;
   an antenna ground;
   a first antenna having a first resonating element arm formed from the first segment and a first antenna feed coupled between the first segment and the antenna ground;
   a second antenna having a second resonating element arm formed from the second segment and a second antenna feed coupled between the second segment and the antenna ground;
   non-near-field communications transceiver circuitry coupled to the first and second antenna feeds and configured to convey non-near-field communications signals using the first and second antennas; and
   near-field communications transceiver circuitry coupled to the peripheral conductive wall and configured to convey near-field communications signals over a conductive path that includes at least some of the first and second segments of the peripheral conductive wall.

2. The electronic device defined in claim 1, wherein the non-near-field communications transceiver circuitry is configured to concurrently convey the non-near-field communications signals at a given frequency using the first and second antennas under a multiple-input and multiple-output (MIMO) scheme.

3. The electronic device defined in claim 2, further comprising:
   a third antenna coupled to the non-near-field communications transceiver circuitry; and
   a fourth antenna coupled to the non-near-field communications transceiver circuitry, wherein the non-near-field communications transceiver circuitry is configured to concurrently convey the non-near-field communications signals at the given frequency using the first, second, third, and fourth antennas under the MIMO scheme.

4. The electronic device defined in claim 1, wherein the near-field communications transceiver circuitry is coupled to the second segment of the peripheral conductive wall via a first inductor and the conductive path includes the first inductor.

5. The electronic device defined in claim 4, further comprising:
   a second inductor coupled between the first and second segments of the peripheral conductive wall across the dielectric-filled gap, wherein the conductive path includes the second inductor.

6. The electronic device defined in claim 5, further comprising:
a third inductor coupled between the first segment of the peripheral conductive wall and the antenna ground, wherein the conductive path includes the third inductor.

7. The electronic device defined in claim 6, wherein the third inductor comprises an adjustable inductor that is configured to tune a non-near-field communications frequency response of the first antenna.

8. The electronic device defined in claim 6, further comprising:
a fourth inductor coupled between the first segment of the peripheral conductive wall and the antenna ground; and
a first capacitor coupled in series between the fourth inductor and the first segment of the peripheral conductive wall.

9. The electronic device defined in claim 8, wherein the first antenna feed comprises a first positive feed terminal coupled to the first segment of the peripheral conductive wall and the second antenna feed comprises a second positive feed terminal coupled to the second segment of the peripheral conductive wall, the electronic device further comprising:
a second capacitor coupled between the first positive feed terminal and the first segment of the peripheral conductive wall; and
a third capacitor coupled between the second positive feed terminal and the second segment of the peripheral conductive wall.

10. The electronic device defined in claim 9, further comprising:
a fourth capacitor coupled between the second segment of the peripheral conductive wall and the antenna ground, wherein the fourth capacitor is configured to form a return path for the second antenna at a frequency greater than or equal to 600 MHz.

11. The electronic device defined in claim 9, wherein the first inductor has a first side coupled to the second segment of the peripheral conductive wall and a second side coupled to the near-field communications transceiver circuitry, the electronic device further comprising:
a fourth capacitor coupled between the second side of the first inductor and the antenna ground, wherein the fourth capacitor is configured to form an open circuit at a near-field communications frequency and a short circuit at a non-near-field communications frequency.

12. The electronic device defined in claim 5, wherein the first and second inductors are configured to pass the near-field communications signals and the second inductor is configured to block the non-near-field communications signals.

13. The electronic device defined in claim 1, further comprising an adjustable circuit configured to tune a non-near-field communications frequency response of the first antenna, wherein the adjustable circuit comprises:
a first terminal coupled to the first segment of the peripheral conductive wall;
a second terminal coupled to the antenna ground;
a first inductor coupled between the first and second terminals;
a capacitor coupled to the first terminal;
a switch coupled to the second terminal; and
second and third inductors coupled in parallel between the capacitor and the switch.

14. An electronic device, comprising:
a housing having a peripheral conductive wall;
a dielectric-filled gap in the peripheral conductive wall that divides the peripheral conductive wall into first and second segments;
an antenna ground;
a first antenna having a first resonating element arm formed from the first segment, a first antenna feed terminal coupled to the first segment, a second antenna feed terminal coupled to the antenna ground, and a first return path coupled between the first segment and the antenna ground;
a second antenna having a second resonating element arm formed from the second segment, a third antenna feed terminal coupled to the second segment, a fourth antenna feed terminal coupled to the antenna ground, and a second return path coupled between the antenna ground and a location on the second segment that is interposed between the dielectric-filled gap and the third antenna feed terminal;
non-near-field communications transceiver circuitry coupled to the first and second antenna feeds and configured to concurrently convey non-near-field communications signals using the first and second antennas; and
near-field communications transceiver circuitry coupled to the first segment of the peripheral conductive wall by an inductor, wherein the near-field communications transceiver circuitry is configured to convey near-field communications signals over a conductive loop path that includes the inductor, a portion of the first segment, the first return path, and a portion of the antenna ground.

* * * * *